United States Patent
Maruyama et al.

(10) Patent No.: US 11,842,023 B2
(45) Date of Patent: Dec. 12, 2023

(54) CAPACITIVE TOUCH PANEL AND DISPLAY DEVICE

(71) Applicant: Sharp Display Technology Corporation, Kameyama (JP)

(72) Inventors: Takenori Maruyama, Kameyama (JP);
Kazutoshi Kida, Kameyama (JP);
Shinji Yamagishi, Kameyama (JP);
Takuma Yamamoto, Kameyama (JP);
Yasuhiro Sugita, Kameyama (JP);
Hiroshi Fukushima, Kameyama (JP)

(73) Assignee: Sharp Display Technology Corporation, Kameyama (JP)

(*) Notice: Subject to any disclaimer, the term of this patent is extended or adjusted under 35 U.S.C. 154(b) by 0 days.

(21) Appl. No.: 17/947,103

(22) Filed: Sep. 17, 2022

(65) Prior Publication Data
US 2023/0096398 A1    Mar. 30, 2023

(30) Foreign Application Priority Data

Sep. 28, 2021  (JP) ................................ 2021-157563

(51) Int. Cl.
*G06F 3/041*  (2006.01)
*G06F 3/044*  (2006.01)

(52) U.S. Cl.
CPC .......... *G06F 3/0447* (2019.05); *G06F 3/0412* (2013.01); *G06F 3/0446* (2019.05); *G06F 3/041662* (2019.05); *G06F 2203/04105* (2013.01)

(58) Field of Classification Search
CPC ................ G06F 3/0447; G06F 3/0412; G06F 3/041662; G06F 3/0446; G06F 2203/04105
See application file for complete search history.

(56) References Cited

U.S. PATENT DOCUMENTS

| | | | | |
|---|---|---|---|---|
| 2015/0355771 | A1* | 12/2015 | Watazu | G06F 3/0445 345/174 |
| 2016/0054846 | A1* | 2/2016 | Lee | G06F 3/04164 345/174 |
| 2016/0139701 | A1* | 5/2016 | Wang | G06F 3/046 345/174 |
| 2016/0357331 | A1* | 12/2016 | Kano | G06F 3/0412 |
| 2017/0097704 | A1* | 4/2017 | Ando | G06F 3/0445 |
| 2017/0371470 | A1* | 12/2017 | Nathan | G06F 3/0445 |
| 2019/0204958 | A1* | 7/2019 | Oh | G06F 3/0445 |

(Continued)

FOREIGN PATENT DOCUMENTS

JP    2021-128511 A    9/2021

*Primary Examiner* — Md Saiful A Siddiqui
(74) *Attorney, Agent, or Firm* — ScienBiziP, P.C.

(57) ABSTRACT

A touch panel include a cover member, a drive electrode, a pressure detecting electrode, and a position detecting electrode. The pressure detecting electrode and the position detecting electrode are alternately arranged in a first direction. The pressure detecting electrode includes a plurality of pressure detecting sections, arranged side by side in a second direction orthogonal to the first direction, that each independently detect a pressure. The position detecting electrode includes a plurality of position detecting sections, arranged side by side in the second direction, that each independently detect a touched position. The area of a pressure detecting section is larger than the area of a position detecting section.

9 Claims, 17 Drawing Sheets

(56) References Cited

U.S. PATENT DOCUMENTS

| | | | |
|---|---|---|---|
| 2020/0241681 A1* | 7/2020 | Chen | G06F 3/0445 |
| 2021/0255737 A1 | 8/2021 | Kida et al. | |
| 2022/0171489 A1* | 6/2022 | Nathan | G06F 3/0443 |

* cited by examiner

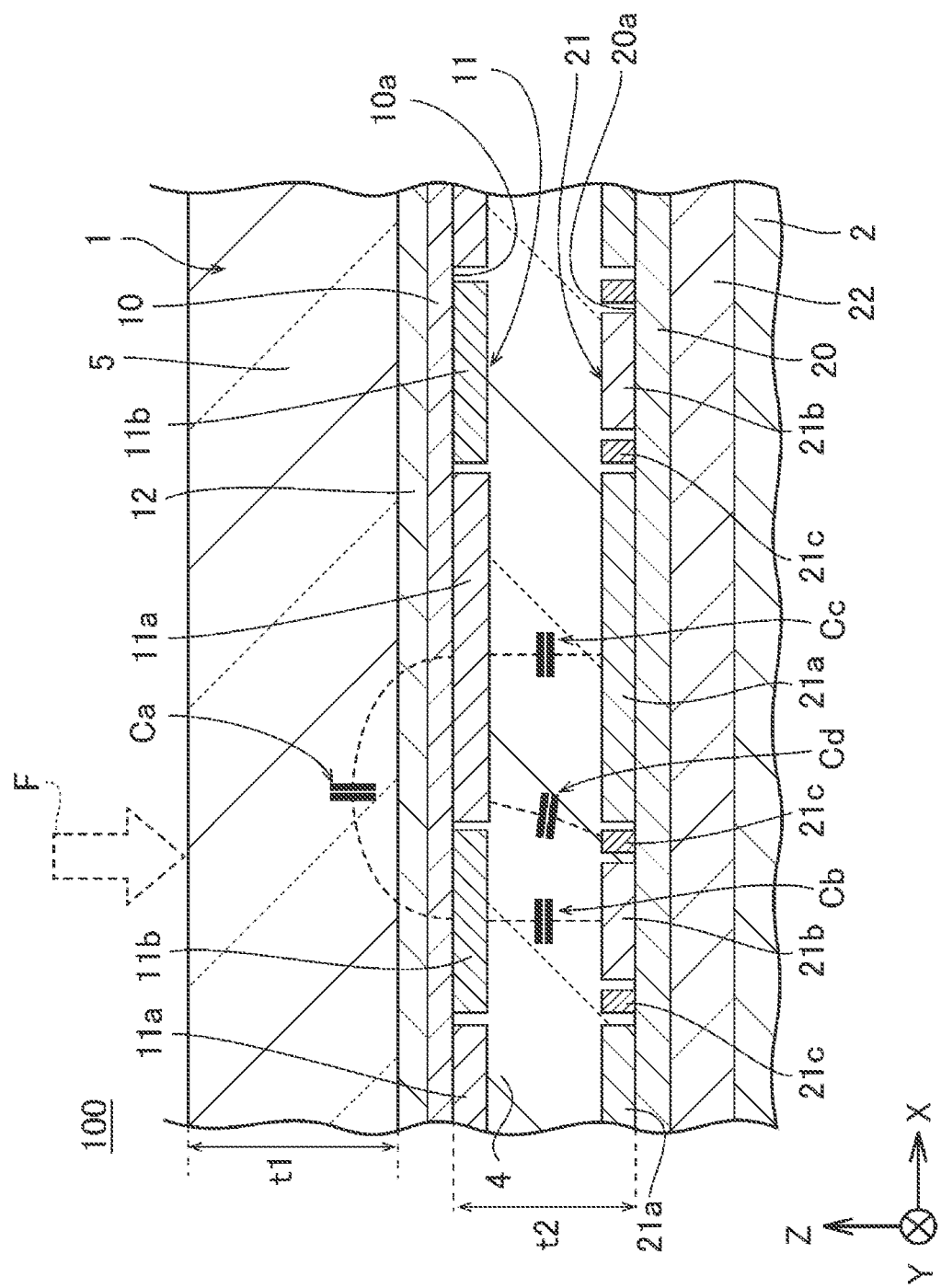

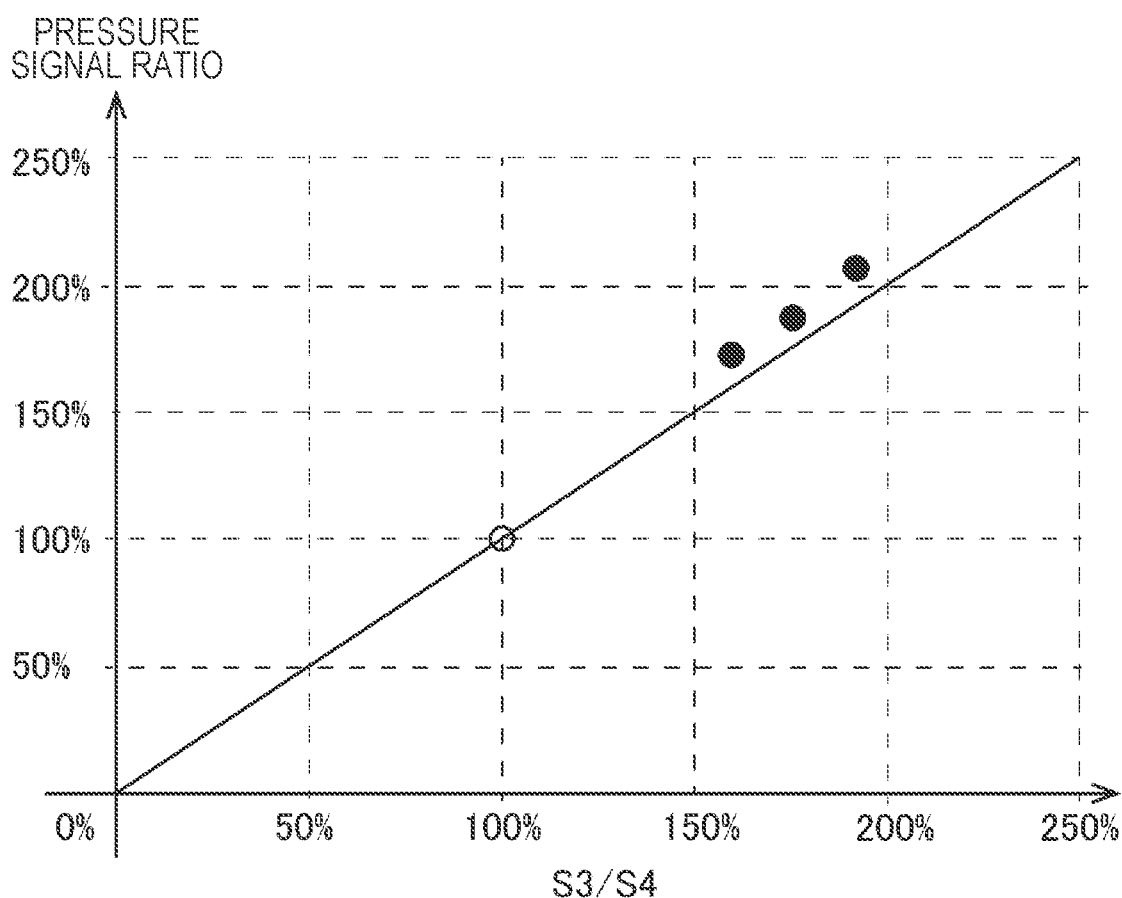

CAPACITIVE TOUCH PANEL AND DISPLAY DEVICE

BACKGROUND

1. Field

The present disclosure relates to a capacitive touch panel and a display device.

2. Description of the Related Art

Conventionally, there have been known a capacitive touch panel including a pressure detecting electrode and a position detecting electrode and a display device. Such a capacitive touch panel and such a display device are disclosed in Japanese Unexamined Patent Application Publication No. 2021-128511.

The capacitive touch panel of Japanese Unexamined Patent Application Publication No. 2021-128511 includes a drive electrode formed on a first substrate, a position sense electrode formed on a second substrate, and a pressure sense electrode formed on the second substrate. In this capacitive touch panel, the capacitive coupling of a pointer to the drive electrode and the position sense electrode causes a decrease in capacitance between the drive electrode and the position sense electrode, bringing about a change in a signal from the position sense electrode. On the basis of this change in the signal from the position sense electrode, the position of the pointer is detected. Further, the shortening of the distance between the drive electrode and the pressure sense electrode due to the pressing of the capacitive touch panel by the pointer causes an increase in capacitance between the drive electrode and the pressure sense electrode, bringing about a change in a signal from the pressure sense electrode. On the basis of this change in the signal from the pressure sense electrode, the magnitude of the pressing is detected.

Note here that the capacitive touch panel of Japanese Unexamined Patent Application Publication. No. 2021-128511 is provided with a cover member to reduce damage to the capacitive touch panel. This causes the capacitive touch panel to be pressed by the pointer via the cover member. This makes it hard for the capacitive touch panel to deform even when pressed, making it hard for the distance between the drive electrode and the pressure sense electrode to change. This results in a decrease in the amount of change in capacitance between the drive electrode and the pressure sense electrode, undesirably causing a decrease in pressure detection sensitivity.

It is desirable to provide a capacitive touch panel and a display device that make it possible to improve pressure detection sensitivity even in a case where a cover member is provided.

SUMMARY

According to a first aspect of the disclosure, there is provided a capacitive touch panel including a touch panel section including a plurality of drive electrodes to which a drive signal is supplied, a plurality of pressure detecting electrodes, and a plurality of position detecting electrodes and a cover member disposed at a touch surface side of the touch panel section, wherein of the plurality of pressure detecting electrodes and the plurality of position detecting electrodes, a pressure detecting electrode and a position detecting electrode are alternately arranged in a first direction, the plurality of drive electrodes are arranged side by side in a second direction that is orthogonal to the first direction in plan view, the plurality of pressure detecting electrodes each include a plurality of pressure detecting sections, arranged side by side in the second direction, that each independently detect a pressure, the plurality of position detecting electrodes each include a plurality of position detecting sections, arranged side by side in the second direction, that each independently detect a touched position, and in the touch panel section, furthermore, an area of at least one of the plurality of pressure detecting sections is larger than an area of at least one of the plurality of position detecting sections.

According to a second aspect of the disclosure, there is provided a capacitive touch panel including a touch. panel section including a plurality of drive electrodes to which a drive signal is supplied, a plurality of pressure detecting electrodes, and a plurality of position detecting electrodes and a cover member disposed at a touch surface side of the touch panel section, wherein of the plurality of pressure detecting electrodes and the plurality of position detecting electrodes, a pressure detecting electrode and a position detecting electrode are alternately arranged in a first direction, the plurality of drive electrodes are arranged side by side in a second direction that is orthogonal to the first direction in plan view, the plurality of pressure detecting electrodes each include a plurality of pressure detecting sections, arranged side by side in the second direction, that each independently detect a pressure, the plurality of position detecting electrodes each include a plurality of position detecting sections, arranged side by side in the second direction, that each independently detect a touched position, and in the touch panel section, furthermore, either a distance between center positions of the plurality of pressure detecting sections in the first direction or a distance between center positions of the plurality of pressure detecting sections in the second direction is longer than or equal to 5 mm and shorter than or equal to 10 mm and the other distance is longer than or equal to 4.9 mm and shorter than or equal to 10 mm.

According to a third aspect of the disclosure, there is provided a display device including the capacitive touch panel according to the first or second aspect and a display that displays an image.

BRIEF DESCRIPTION OF THE DRAWINGS

FIG. 3 is a cross-sectional view of a touch panel according to the first embodiment;

FIG. 6 is a diagram for explaining a relationship between the areas of a pressure detecting section and a position detecting section and a pressure signal ratio;

DESCRIPTION OF THE EMBODIMENTS

Figure 1:
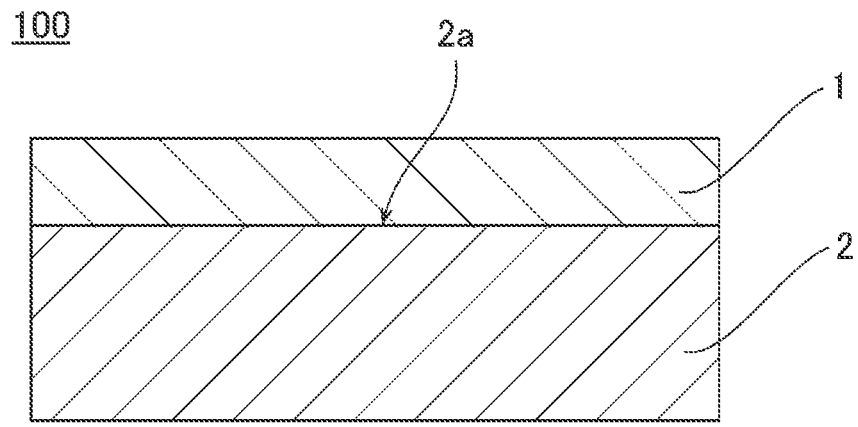
FIG. 1 is a cross-sectional view schematically showing a display device according to a first embodiment.

The following describes embodiments of the present disclosure with reference to the drawings. It should be noted that the present disclosure is not limited to the following embodiments but is subject to appropriate design change to such an extent as to fulfill a configuration of the present disclosure. Further, in the following description, identical signs assigned to identical components or components having similar functions are adhered to throughout the drawings, and a repeated description of such components is omitted. Further, configurations described in embodiments and modifications may be appropriately combined or changed without departing from the scope of the present disclosure. Further, for ease of explanation, the drawings to be referred to below show configurations in a simplistic or schematic form or omit some constituent members. Further, the dimensional ratios between constituent members shown in the drawings do not necessarily indicate actual dimensional ratios.

First Embodiment

Configuration of Display Device

FIG. 1 is a cross-sectional view schematically showing a display device 100 according to a first embodiment. The display device 100 includes a touch panel 1 and a display section 2 that displays an image on a display surface 2a. The display section 2 is constituted, for example, by a liquid crystal display or an organic EL (electroluminescence) display.

Configuration of Touch Panel

Figure 2:
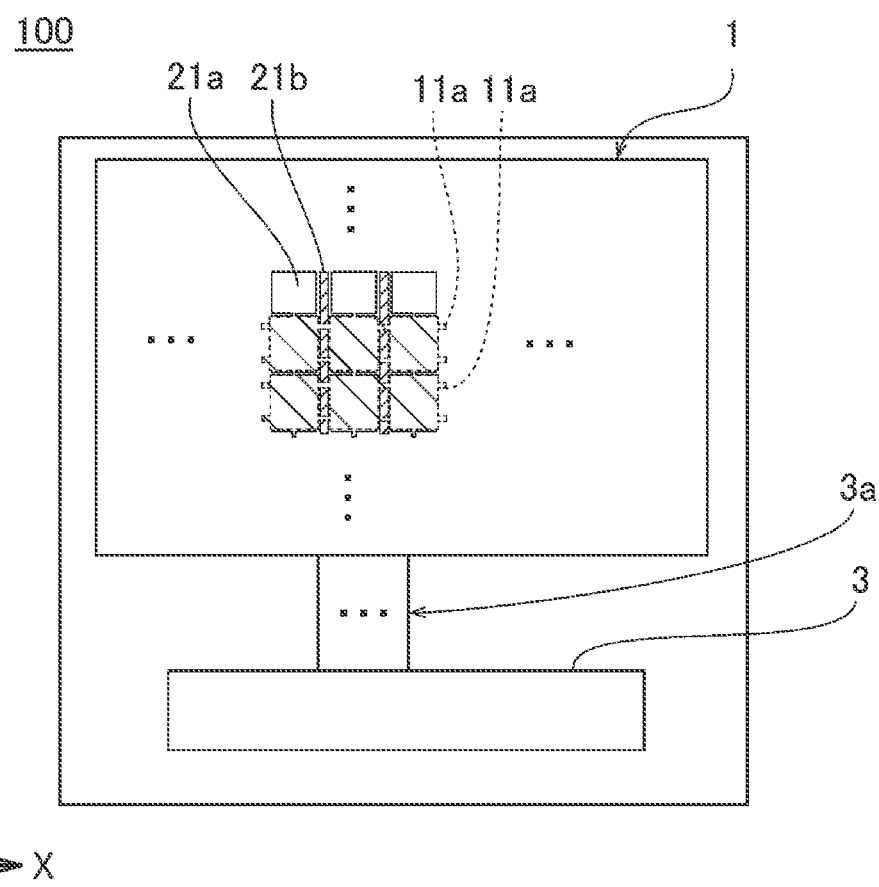
FIG. 2 is a plan view schematically showing a configuration of the display device according to the first embodiment.

FIG. 2 is a plan view schematically showing a configuration of the display device 100 according to the first embodiment. The touch panel 1 of the display device 100 detects a position touched by a pointer or a pressure exerted by the pointer. As shown in FIG. 2, the touch panel 1 includes a plurality of drive electrodes 11a, a plurality of pressure detecting electrodes 21a, and a plurality of position detecting electrodes 21b. The touch panel 1 is a mutually capacitive touch panel that detects changes in capacitance between the plurality of drive electrodes 11a and the plurality of pressure detecting electrodes 21a or the plurality of position detecting electrodes 21b. Further, the display device 100 includes a touch panel controller 3. The touch panel controller 3 is connected to each of the plurality of drive electrodes 11a, each of the plurality of pressure detecting electrodes 21a, each of the plurality of position detecting electrodes 21b via wires 3a.

FIG. 3 is a cross-sectional view of the touch panel 1 according to the first embodiment. As shown in FIG. 3, the touch panel 1 includes a first substrate 10, a pressure-sensitive layer 4, and a second substrate 20. The first substrate 10, the pressure-sensitive layer 4, and the second substrate 20 are joined on top of one another. For example, the first substrate 10 and the second substrate 20 are made of a transparent resin material such as PET (polyethylene terephthalate). Further, the pressure-sensitive layer 4 is a dielectric film containing a dielectric. Further, the pressure-sensitive layer 4 is made of an elastic transparent pressure-sensitive material such as a polymeric material. Further, an OCA (optical clear adhesive) layer 12 is disposed on a side of the first substrate 10 that faces away from the pressure-sensitive layer 4. Moreover, the touch panel 1 includes a cover member 5. The cover member 5 is made, for example, of a glass material. The cover member 5 is disposed at a touch surface side of the first substrate 10 (that faces away from the pressure-sensitive layer 4) across the OCA layer 12. A surface of the cover member 5 is touched or pressed by the pointer. The OCA layer 12 sticks the cover member 5 and the first substrate 10 together. Further, an OCA layer 22 and the display section 2 are disposed at a side of the second substrate 20 that faces away from the pressure-sensitive layer 4. Further, the thickness t1 of the cover member 5 is for example greater than the thickness t2 of the pressure-sensitive layer 4.

As shown in FIG. 3, the touch panel 1 includes a drive electrode layer 11 and a detecting electrode layer 21. The drive electrode layer 11 is formed on a surface 10a of the first substrate 10 that faces toward the pressure-sensitive layer 4. The detecting electrode layer 21 is formed on a surface 20a of the second substrate 20 that faces toward the pressure-sensitive layer 4. The drive electrode layer 11 includes a drive electrode 11a and a floating electrode 11b. The detecting electrode layer 21 includes a position detecting electrode 21b, a pressure detecting electrode 21a, and a shield electrode 21c. Further, the drive electrode 11a, the floating electrode 11b, the position detecting electrode 21b, the pressure detecting electrode 21a, and the shield electrode 21c are made of an electrically conducting transparent material such as ITO (indium tin oxide). Further, the shield electrode 21c is connected to a ground (not illustrated), and the potential of the shield electrode 21c is equal to the potential of the ground.

To the drive electrode 11a, a drive signal is supplied from the touch panel controller 3 (see FIG. 2). The floating electrode 11b is not connected to another electrode or a wire 3a, and the potential of the floating electrode 11b is in a floating state. Further, as shown in FIG. 3, the floating electrode 11b forms a capacitance Ca with the drive electrode 11a. The position detecting electrode 21b is an electrode for detecting a position. touched by the pointer. The position detecting electrode 21*b* forms a capacitance Cb with the floating electrode 11*b*. The pressure detecting electrode 21*a* is an electrode for detecting the presence or absence of a pressure exerted by the pointer and the magnitude of the pressure. The pressure detecting electrode 21*a* forms a capacitance Cc with the drive electrode 11*a*. The shield electrode 21*c* has the potential of the ground in the touch panel 1. As a result, the shield electrode 21*c* inhibits the pressure detecting electrode 21*a* and the position detecting electrode 21*b* from being capacitively coupled to each other. The shield electrode 21*c* forms a capacitance Cd with the drive electrode 11*a*.

Figure 4A:
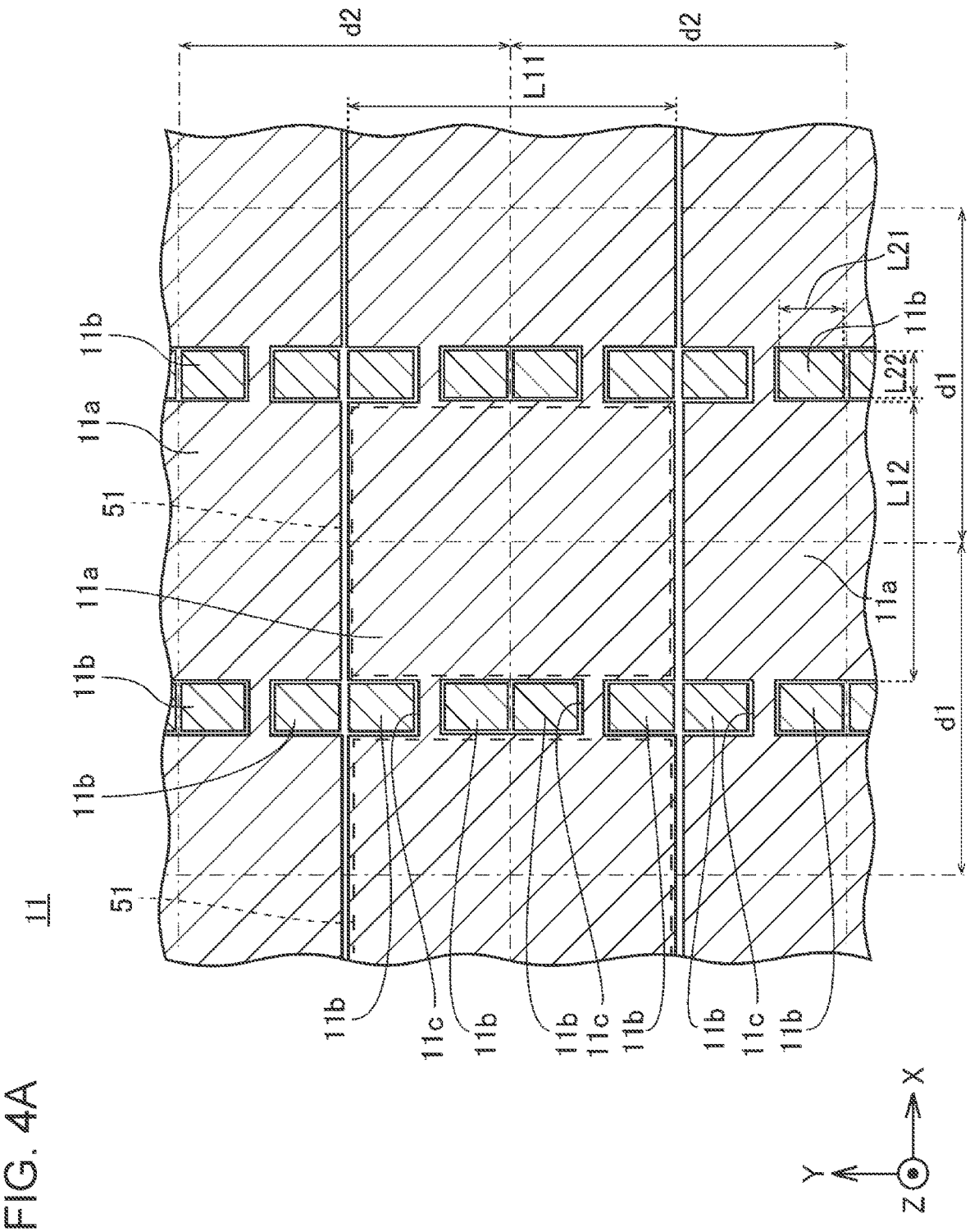
FIG. 4A is a plan view of part of a drive electrode layer.
Figure 4B:
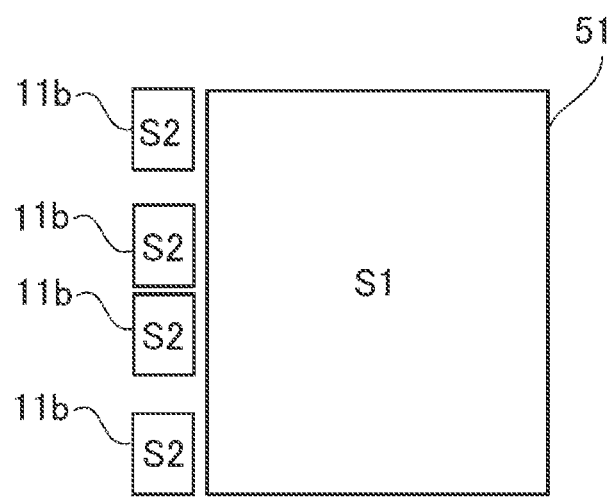
FIG. 4B is a diagram for explaining a relationship between the area of an electrode section of a drive electrode and the areas of floating electrodes.

FIG. 4A. is a plan view of part of the drive electrode layer 11. FIG. 43 is a diagram for explaining a relationship between the area S1 of an electrode section 51 of a drive electrode 11*a* and the areas S2 of floating electrodes 11*b*. As shown in FIG. 4A, the drive electrode 11*a* has a shale formed by connecting a plurality of rectangular electrode sections 51 in a transverse direction. (X direction) across the surface of paper. Two adjacent electrode sections 51 is for example connected to each other by two connections 11*c* extending in the X direction. A plurality of the floating electrodes 11*b* are each not connected to another floating electrode 11*b*. Each floating electrode 11*b* is a rectangular electrode. A floating electrode 11*b* is disposed between two adjacent electrode sections 51 in the X direction. Further, two floating electrodes 11*b* are disposed between two connections 11*c* in a Y direction. The length L22 of a floating electrode 11*b* in the X direction is smaller than the length L12 of an electrode section 51 in the X direction, and the length L21 of a floating electrode 11*b* in the Y direction is smaller than the length L11 of an electrode section 51 in the Y direction. Further, as shown in FIGS. 2 and 3, a drive electrode 11*a* is disposed in such a position as to overlap a pressure detecting electrode 21*a* in plan view. Further, a floating electrode 11*b* is disposed in such a position as to overlap a position detecting electrode 21*b* in plan view. Further, as shown in FIG. 4B, the area S1 of each of the plurality of electrode sections 51 is larger than the areas S2 of floating electrodes 11*b*.

Figure 5A:
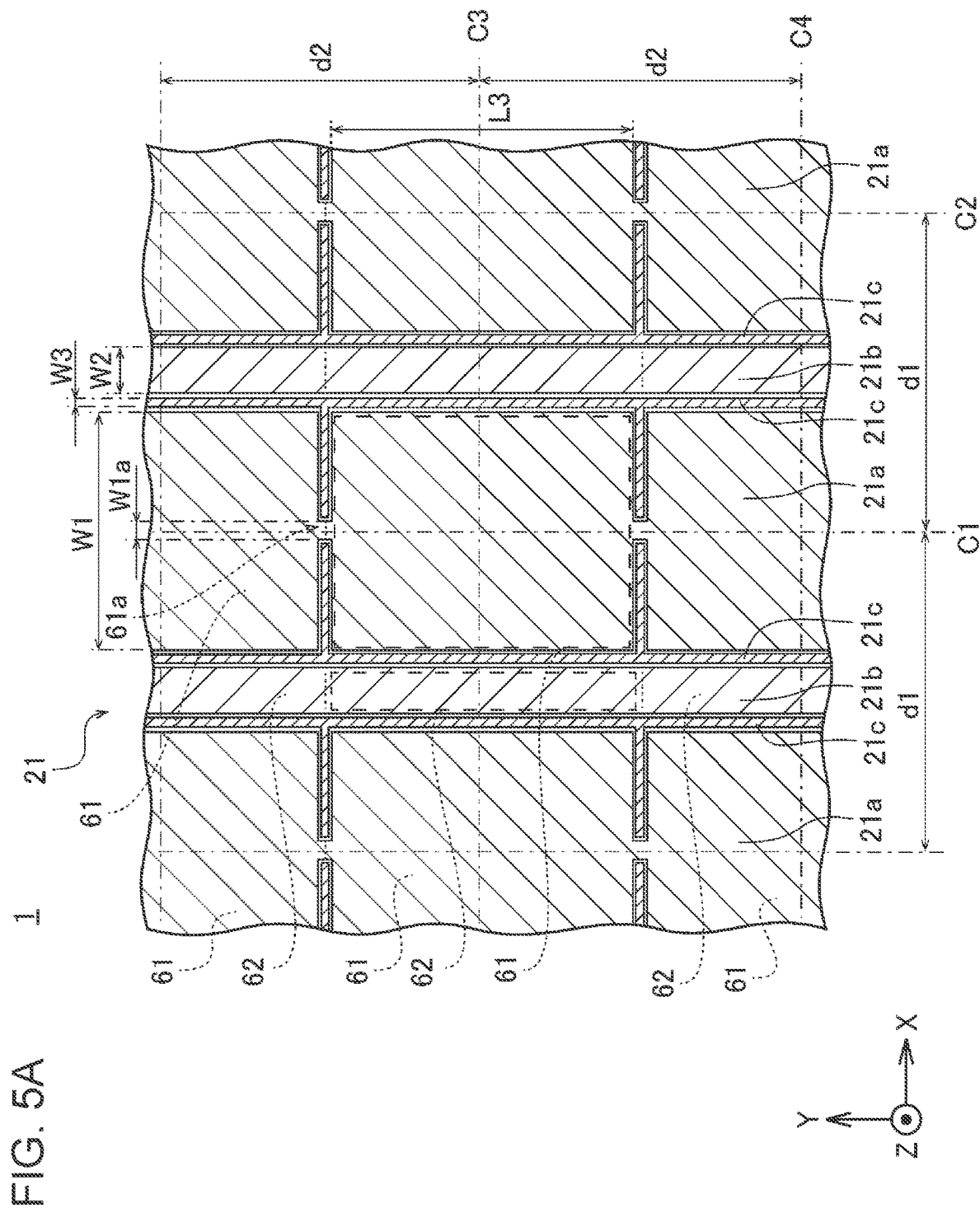
FIG. 5A is a plan view of part of a detecting electrode layer.
Figure 5B:
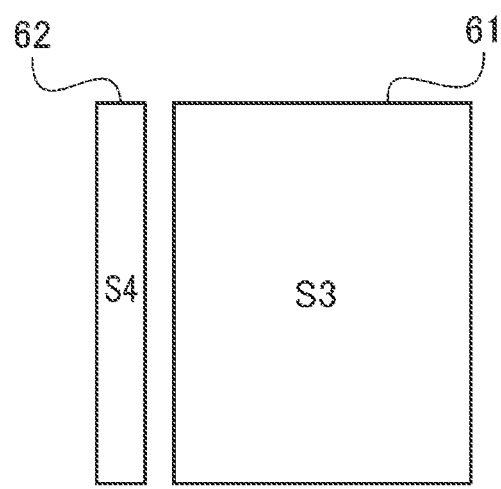
FIG. 5B is a diagram for explaining a relationship between the area of a pressure detecting section and the area of a position detecting section.

FIG. 5A is a plan view of part of the detecting electrode layer 21. FIG. 5B is a diagram for explaining a relationship between the area S3 of a pressure detecting section 61 and the area S4 of a position detecting section 62. As shown in FIG. 5A, the detecting electrode layer 21 includes an alternate arrangement of pressure detecting electrodes 21*a* and position detecting electrodes 21*b* in a transverse direction (X direction) across the surface of paper. The plurality of pressure detecting electrodes 21*a* and the plurality of position detecting electrodes 21*b* each extend in a longitudinal direction. (Y direction) across the surface of paper. Further, a shield electrode 21*c* is formed between a pressure detecting electrode 21*a* and a position detecting electrode 21*b*.

Further, as shown in FIG. 5A, the plurality of pressure detecting electrodes 21*a* each include a plurality of pressure detecting sections 61 arranged side by side in the Y direction. The plurality of pressure detecting sections 61 each independently detect a pressure exerted by the pointer. Earth of the plurality of pressure detecting sections 61 corresponds to a pressed position (coordinates of pressure) that the touch panel controller 3 detects. In other words, a pressure detecting section 61 constitutes one (unit cell) of the coordinates of pressure. Two pressure detecting sections 61 adjacent to each other in the Y direction are connected to each other by a connecting 61*a*. A connection 61*a* is formed, for example, in such a position as to overlap an X-direction center line C1 of a pressure detecting electrode 21*a* in plan view. Further, a pressure detecting section 61 has the shape of a rectangle in plan view. This configuration makes it possible to inhibit the area to be pressed from varying depending on what position is pressed in the Y direction. The width of a pressure detecting section 61 in the X direction is W1, and the length of a pressure detecting section 61 in the Y direction is L3. Further, the width W1*a* of a connection. 61*a* is smaller than the width W1 of a pressure detecting section 61. Further, part of a shield electrode 21*c* is disposed in a gap between a pressure detecting section 61 and a pressure detecting section 61 adjacent to the pressure detecting section 61 in the Y direction.

Further, as shown in FIG. 5A, the plurality of position detecting electrodes 21*b* each include a plurality of position detecting sections 62 arranged side by side in the Y direction. The plurality of position detecting sections 62 each independently detect a position touched by the pointer. Each of the plurality of position detecting sections 62 corresponds to a touched position (coordinates of touch) that the touch panel controller 3 detects. In other words, a position detecting section 62 constitutes one (unit cell) of the coordinates of touch. Further, a position detecting section 62 has the shape of a rectangle in plan view. The width of a position detecting section 62 in the X direction is W2, and the length of a position detecting section 62 in the Y direction is L3.

Note here that in the first embodiment, the width W1 of a pressure detecting section 61 is greater than the width W2 of a position detecting section 62. Further, the length L3 of a pressure detecting section 61 is equal to the length L3 of a position detecting section 62. As a result, as shown in FIG. 5B, the area S3 of a pressure detecting section 61 is larger than the area S4 of a position detecting section 62. In the first embodiment, the area S3 is not less than 2.5 times and not more than 7.3 times as large as the area S4. Making the area S3 not less than 2.5 times as large as the area S4 and, while improving pressure detection sensitivity, making the area S3 not more than 7.3 times as large as the area S4 makes it possible to reduce deterioration of pressure detection resolution. Specifically, for example, the area S3 is not less than 4 times and not more than 5 times (e.g. 4.7 times) as large as the area S4. Further, the area of each of the plurality of pressure detecting sections 61 is S3, and the area of each of the plurality of position detecting sections 62 is S4. As a result, the total area. of the plurality of pressure detecting sections 61 (S3×Number of Pressure Detecting Sections 61) is larger than the total area of the plurality of position detecting sections 62 (S4×Number of Position. Detecting Sections 62). Note here that the capacitance Cc formed between a drive electrode 11*a* and a pressure detecting section 61 is proportional to the area of the pressure detecting section 61, and the magnitude of a pressure signal is proportional to the amount of change in the capacitance Cc. For this reason, the foregoing configuration makes it possible to increase the area S3 of a pressure detecting section 61, thus making it possible to improve pressure detection sensitivity even in a case where the touch panel 1 is provided with the cover member 5. Further, the area S3 of a pressure detecting section 61 can be increased by making the width W1 of the pressure detecting section 61, as a pressure detecting section 61 and a position detecting section 62 each have the shape of a rectangle. Unlike in a case where a pressure detecting section 61 is formed in the shape of a rhombus, a gap between a pressure detecting section 61 and a position detecting section 62 can be inhibited from increasing even if the pressure detecting section 61 is larger in dimension than the position detecting section 62.

As shown in FIG. 5A, in the X-direction width of a portion of a shield electrode 21c disposed between a pressure detecting section 61 and a position detecting section 62 is W3. The width W3 is smaller than the width W1 of a pressure detecting section 61, and is smaller than the width W2 of a position detecting section 62.

Further, as shown in FIG. 5A, the distance between an X-direction center line C1 of a pressure detecting section 61 and an X-direction center line C2 of a pressure detecting section 61 adjacent to the pressure detecting section 61 in the X direction is d1. The distance between a Y-direction center line C3 of a pressure detecting section 61 and a Y-direction center line C4 of a pressure detecting section 61 adjacent to the pressure detecting section 61 on a negative side of the Y direction is d2. In the first embodiment, the distance d1 and the distance d2 are for example 4.9 mm.

Relationship Between Areas S3 and S4 of Pressure Detecting Section 61 and Position Detecting Section 62 and Pressure Signal Ratio Next, a relationship between the areas S3 and S4 of a pressure detecting section 61 and a position detecting section 62 and a pies pure signal ratio is described with reference to FIG. 6.

FIG. 6 is a diagram for explaining a relationship between the areas S3 and S4 of a pressure detecting section 61 and a position detecting section 62 and a pressure signal ratio. As shown in FIG. 6, the magnitudes of signals (pressure signals) that the touch panel controller 3 obtains from the pressure detecting section 61 were simulated with varying magnitudes of the area S3 of the pressure detecting section 61 with respect to the area S4 of the position. detecting section 62. The magnitude of a pressure signal in a case where the area S3 and the area S4 are equal to each other (S3/S4=100%) was assumed as a pressure signal ratio of 100%. Further, it was assumed in the simulation that the relative dielectric constant of the pressure-sensitive layer 4 is 3, that the amount of change in the pressure-sensitive layer 4 under pressure is 5%, that the thickness of the pressure-sensitive layer 4 is 200 μm, that the thickness of the cover member 5 is 1.1 mm, that the dielectric constant of the cover member 5 is 7.0, that the thickness of the OCA layer 12 is 150 μm, and that the thickness of the first substrate 10 is 50 μm. It should be noted that these conditions are just a few examples used to perform the simulation, and the present disclosure is not limited to these conditions.

As a result of the simulation, the pressure signal ratio was 172% in a case where S3/S4 was 159%. Further, the pressure signal ratio was 187% in a case where S3/S4 was 175%. Further, the pressure signal ratio was 207% in a case where S3/S4 was 191%, Accordingly, as shown in FIG. 6, it turned out that the higher S3/S4 becomes, the higher the pressure signal ratio becomes. The first embodiment makes it possible to improve pressure detection sensitivity even in a case where the touch panel 1 is provided with the cover member 5, as the area S3 is larger than the area S4.

Operation of Touch Panel 1

Next, the operation of the touch panel 1 is described with reference to FIG. 3. As shown in FIG. 3, the floating electrode 11b forms the capacitance Cb with the position detecting electrode 21b. When a pointer F touches the cover member 5, the pointer F becomes capacitively coupled to the drive electrode 11a and the floating electrode 11b. This causes decreases in the capacitances (Ca and Cb) between the drive electrode 11a and the position detecting electrode 21b via the pointer F and the floating electrode 11b and causes a change in a signal that is detected by the position detecting electrode 21b (position detecting section 62), whereby the position of the pointer F is detected. It should be noted that at this point in time, there is almost no change in the capacitance Cc between the drive electrode 11a and the pressure detecting electrode 21a (pressure detecting section 61).

Further, as shown in FIG. 3, the pressing of the cover member 5 by the pointer F causes the pressure-sensitive layer 4 to become depressed, so that the distance between the drive electrode 11a the pressure detecting electrode 21a (pressure detecting section 61) becomes shorter. This causes an increase in the capacitance Cc between the drive electrode 11a and the pressure detecting electrode 21a, so that there is a change in a signal that is detected by the pressure detecting electrode 21a (pressure detecting section 61). Then, on the basis of the change in the signal (pressure signal) that is detected by the pressure detecting electrode 21a, the magnitude of the pressing (pressure value) is detected. Note here that since the drive electrode 11a is closer to the shield electrode 21c than to the position detecting electrode 21b, the drive electrode 11a forms the capacitance Cd with the shield electrode 21c, not the position detecting electrode 21b. This results in suppression of increases in the capacitances between the drive electrode 11a and the position detecting electrode 21b, thus making it possible to reduce the effect of the pressing on detection of a touch position. This makes it possible to detect a touch position with high accuracy also when the drive electrode 11a has been pressed by the pointer F.

Second Embodiment

Figure 7A:
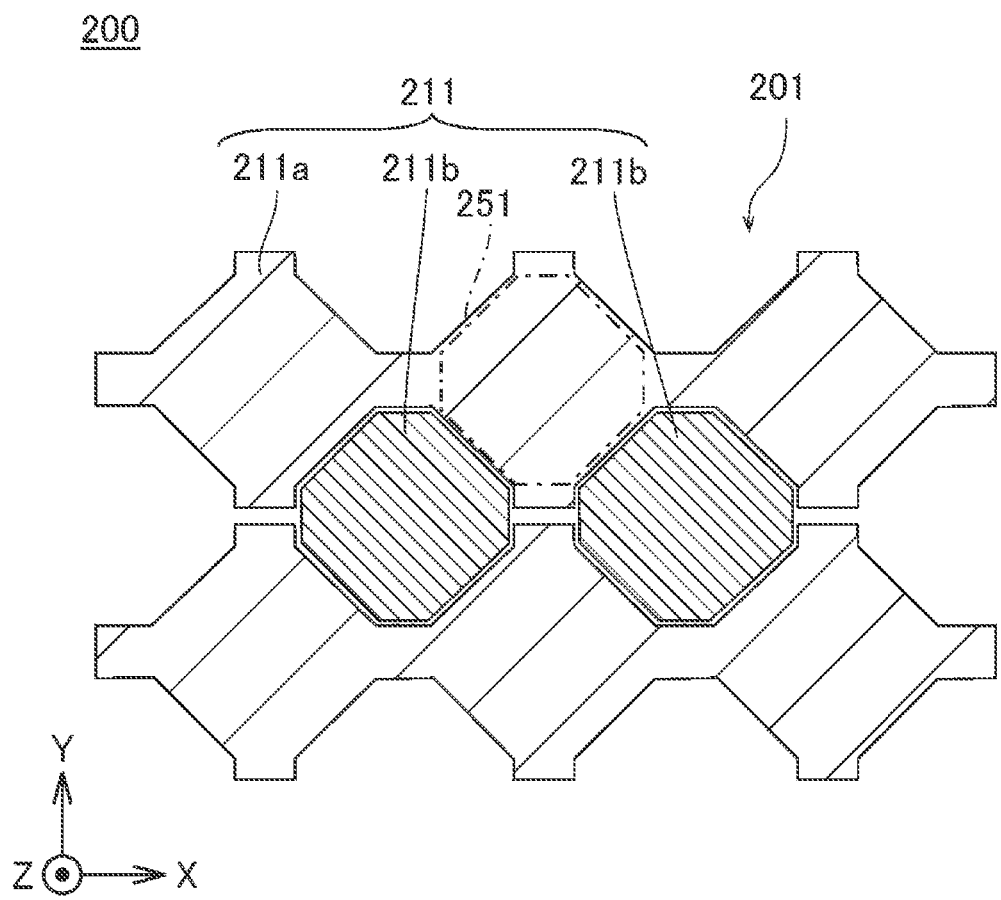
FIG. 7A is a plan view showing a configuration of a drive electrode layer of a display device according to a second embodiment.
Figure 7B:
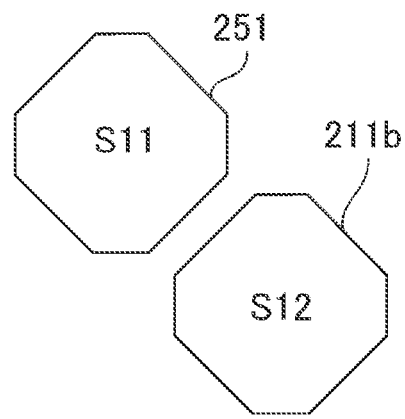
FIG. 7B is a diagram for explaining a relationship between the area of an electrode section of a drive electrode and the area of a floating electrode.

Next, a configuration of a display device 200 according to a second embodiment is described with reference to FIGS. 7A to 8B. In the second embodiment, a pressure detecting section 261 is formed in the shape of a rhombus. FIG. 7A is a plan view showing a configuration of a drive electrode layer 211 of the display device 200 according to the second embodiment. FIG. 7B is a diagram for explaining a relationship between the area S11 of an electrode section of a drive electrode 211a and the area S12 of a floating electrode 211b. It should be noted that components that are identical to those of the first embodiment are given the same signs as those of the first embodiment, and a description or such components is omitted.

As shown in FIG. 7A, the display device 200 includes a touch panel 201. The touch panel 201 includes the drive electrode layer 211. In the second embodiment, the drive electrode layer 211 is formed with a drive electrode 211a having a rhomboidal electrode section 251 and a rhomboidal floating electrode 211b. A plurality of the electrode sections 251 are arranged side by side in the X direction. Two adjacent electrode sections 251 are connected to each other. A floating electrode 211b is surrounded by four electrode sections 251 in plan view. Further, as shown in FIG. 7B, in the second embodiment, the area S11 of an electrode section 251 and the area S12 of a floating electrode 211b are equal to each other.

Figure 8A:
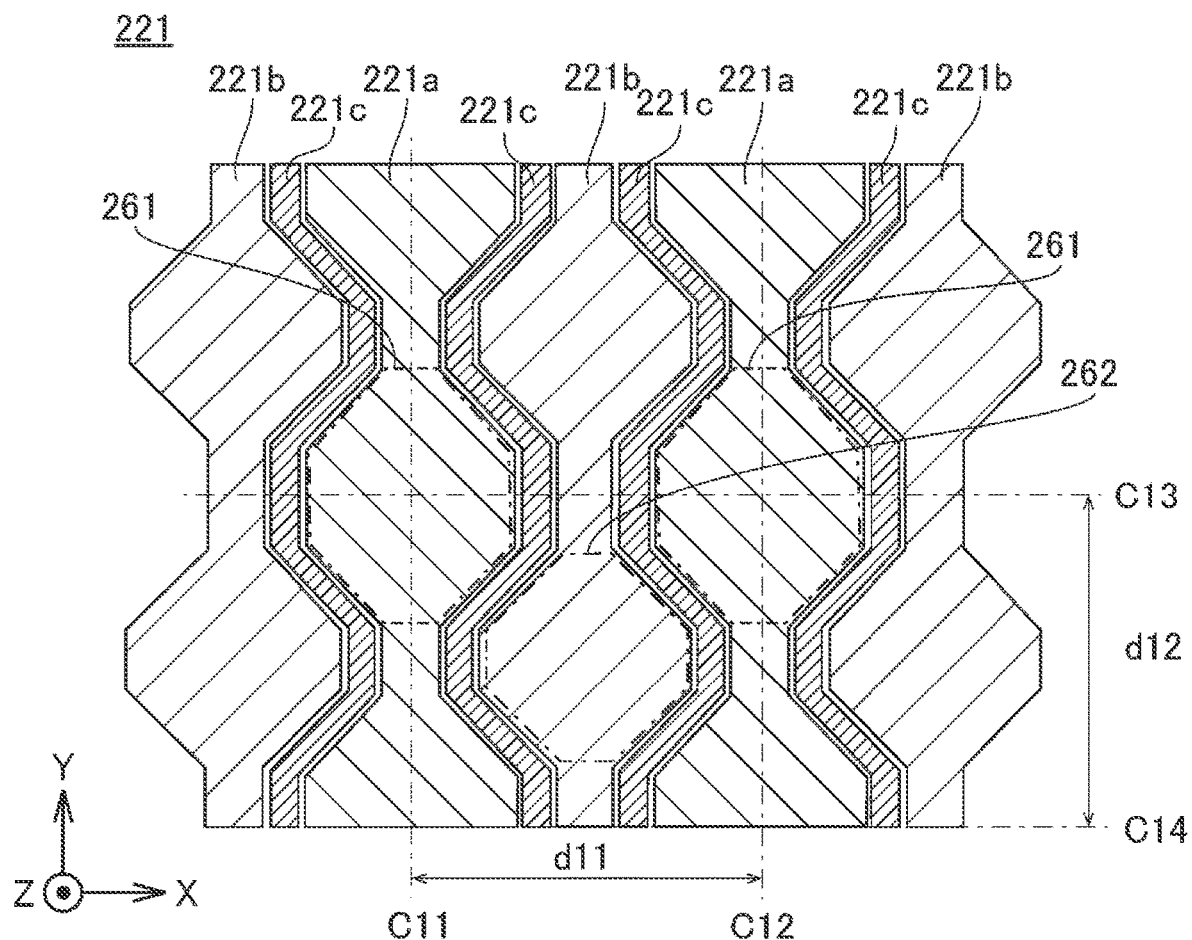
FIG. 8A is a plan view showing a configuration of a detecting electrode layer according to the second embodiment.
Figure 8B:
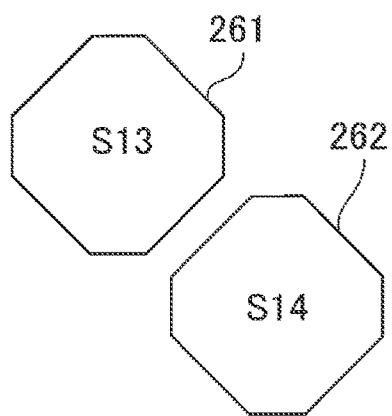
FIG. 8B is a diagram for explaining a relationship between the area of a pressure detecting section and the area of a position detecting section.

FIG. 8A is a plan view showing a configuration of a detecting electrode layer 221 according to the second embodiment. FIG. 8B is a diagram for explaining a relationship between the area S13 of a pressure detecting section 261 and the area S14 of a position detecting section 262. The touch panel 201 includes the detecting electrode layer 221.

The detecting electrode layer 221 is provided with a pressure detecting electrode 221a having a plurality of rhomboidal pressure detecting sections 261, a position detecting electrode 221b having a plurality of rhomboidal position detecting sections 262, and a shield electrode 221c disposed between a pressure detecting electrode 221a and a position detecting electrode 221b. The plurality of pressure detecting sections 261 are arranged side by side in the Y direction. Two pressure detecting sections 261 adjacent to each other in the Y direction are connected to each other. Further, two position detecting sections 262 adjacent to each other in the Y direction are connected to each other. Further, as shown in FIG. 8B, in the second embodiment, the area S13 of a pressure detecting section 261 and the area. S14 of a positon detecting section 262 are equal to each other.

In the second embodiment, as shown in FIG. 8A, the distance d11 (X-direction pitch) between an. X-direction. center line C11 of a pressure detecting section 261 and an X-direction center line C12 of a pressure detecting section 261 adjacent to the pressure detecting section 261 in the X direction is longer than or equal to 5 mm and shorter than or equal to 10 mm. Further, the distance d12 (Y-direction pitch) between a Y-direction center line C13 of a pressure detecting section 261 and a Y-direction center line C14 of a pressure detecting section 261 adjacent to the pressure detecting section 261 on a negative side of the Y direction is longer than or equal to 5 mm and shorter than or equal to 10 mm.

Relationship between Distance d11 and Magnitude of Pressure Signal

Next, a relationship between the distance d11 and the magnitudes of pressure signals is described with reference to FIG. 9.

Figure 9:
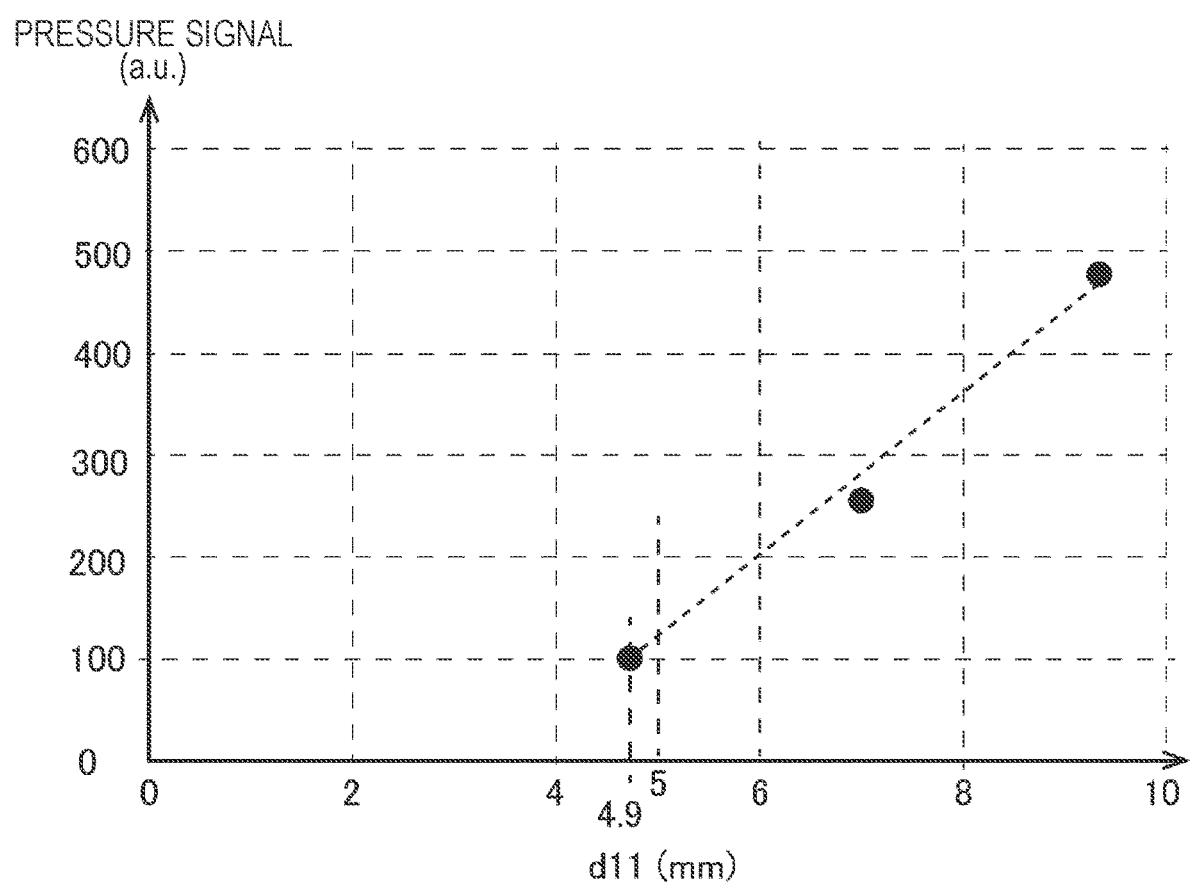
FIG. 9 is a diagram showing a relationship between the distance between a plurality of pressure detecting sections and the strengths of signals (pressure signals) from a pressure detecting section.

FIG. 9 is a diagram showing a relationship between the distance d11 between an X-direction center line C11 of a pressure detecting section 261 and an X-direction center live C12 of a pressure detecting section 261 adjacent to the pressure detecting section 261 in the X direction and the strength of a signal (pressure signal) from a pressure detecting section 261.

As shown in FIG. 9, the magnitudes of signals (pressure signals) that the touch panel controller 3 obtains from the pressure detecting section 261 were simulated with varying magnitudes of the distance d11. The strength of a pressure signal in a case where the distance d11 is 4.9 mm was assumed as 100%. Further, it was assumed in the simulation that the relative dielectric constant of the pressure-sensitive layer 4 is 3, that the amount of change in the pressure-sensitive layer 4 under pressure is 5%, that the thickness of the pressure-sensitive layer 4 is 200 μm, that the thickness of the cover member 5 is 1.1 mm, that the dielectric constant of the cover member 5 is 7.0, that the thickness of the OCA layer 12 is 150 μm, and that the thickness of the first substrate 10 is 50 μm. Let it be also assumed that the distance d12 is equal to the distance d11. It should be noted that these conditions are just a few examples used to perform the simulation, and the present disclosure is not limited to these conditions.

As a result of the simulation, the strength of a pressure signal was 256% in a case where the distance d11 was 7 mm. The strength of a pressure signal was 476% in a case where the distance d11 was 9.3 mm. Accordingly, it turned out that in a case where the distance d11 is longer than or equal to 5 mm and shorter than or equal to 10 mm, the strength of a pressure signal is higher than in a case where the distance d11 is 4.9 mm. The second embodiment makes it possible to increase the dimensions of each of the plurality of pressure detecting sections 261 and to improve pressure detection sensitivity even in a case where the touch panel 201 is provided with the cover member 5, as the distance d11 and the distance d12 are longer than or equal to 5 mm and shorter than or equal to 10 mm. The other components and effects of the second embodiment are similar to those of the first embodiment.

Third Embodiment

Figure 10:
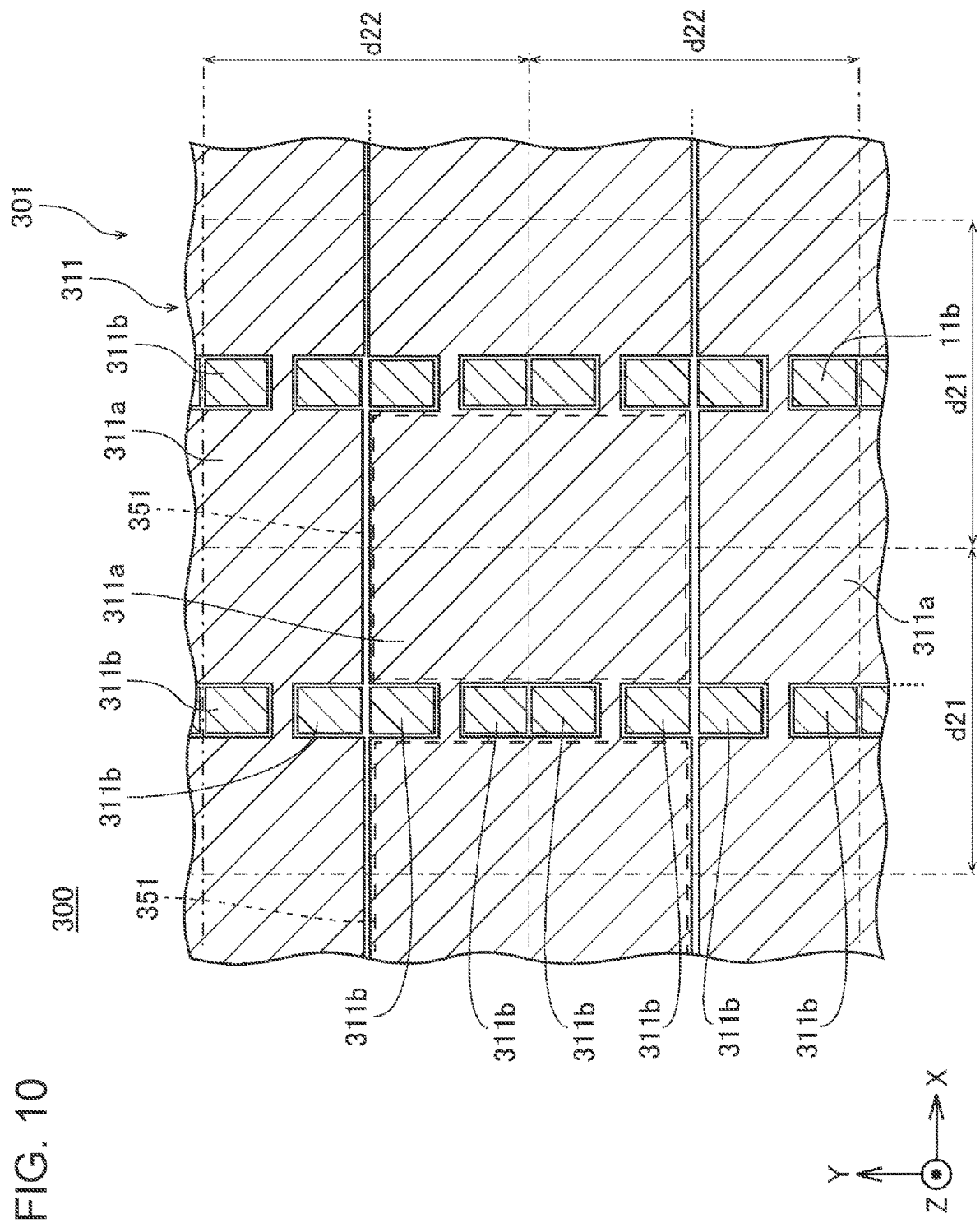
FIG. 10 is a plan view of part of a drive electrode layer according to a third embodiment.
Figure 11:
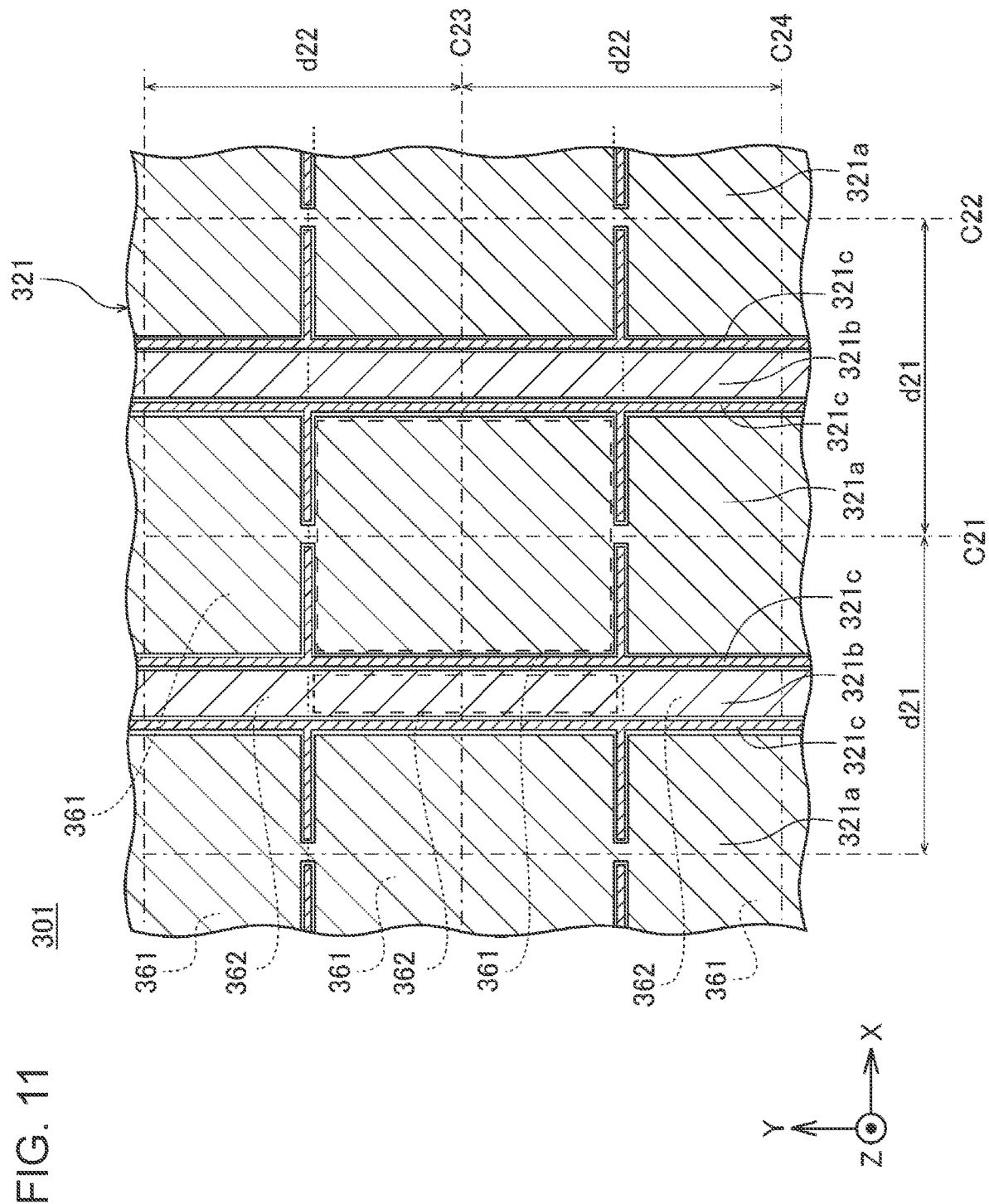
FIG. 11 is a plan view of part of a detecting electrode layer according to the third embodiment.

Next, a configuration of a display device 300 according to a third embodiment is described with reference to FIGS. 10 and 11. In the third embodiment, the distance d21 between a center line C21 of a rectangular pressure detecting section 361 and a center line C22 of a pressure detecting section 361 adjacent to the pressure detecting section 361 is longer than or equal to 5 mm and shorter than or equal to 10 mm. FIG. 10 is a plan view or part of a drive electrode layer 311 according to the third embodiment. FIG. 11 is a plan view of part of a detecting electrode layer 321 according to the third embodiment. It should be noted that components that are identical to those of she first or second embodiment are given the same signs as those of the first or second embodiment, and a description of such components is omitted.

As shown in FIG. 10, the display device 300 includes a touch panel 301. The touch panel 301 includes the drive electrode layer 311. The drive electrode layer 311 is provided with a plurality of drive electrodes 311a and a plurality of floating electrodes 311b. The drive electrodes 311a each include a plurality of rectangular electrode sections 351.

As shown in FIG. 11, the touch panel 301 includes the detecting electrode layer 321. The detecting electrode layer 321 is provided with a plurality of pressure detecting electrodes 321a. and a plurality of position detecting electrodes 321b. A shield electrode 321c is disposed between a pressure detecting electrode 321a and a position detecting electrode 321b. The plurality of pressure detecting electrodes 321a each include a plurality of the pressure detecting sections 361. In the third embodiment, the distance d21 between an X-direction center line C21 of a pressure detecting section 361 and an X-direction center line C22 of a pressure detecting section 361 adjacent to the pressure detecting section 361 in the X direction is longer than or equal to 5 mm and shorter than or equal to 10 mm. Further, the distance d22 between a Y-direction center line C23 of a pressure detecting section 361 and a Y-direction center line C24 of a pressure detecting section 361 adjacent to the pressure detecting section 361 on a negative side of the F direction is longer than or equal to 5 mm and shorter than or equal to 10 mm. Further, the plurality of position detecting electrodes 321b each include a plurality of rectangular position detecting sections 362. The other components of the third embodiment are similar to those of the first. embodiment.

Figure 12:
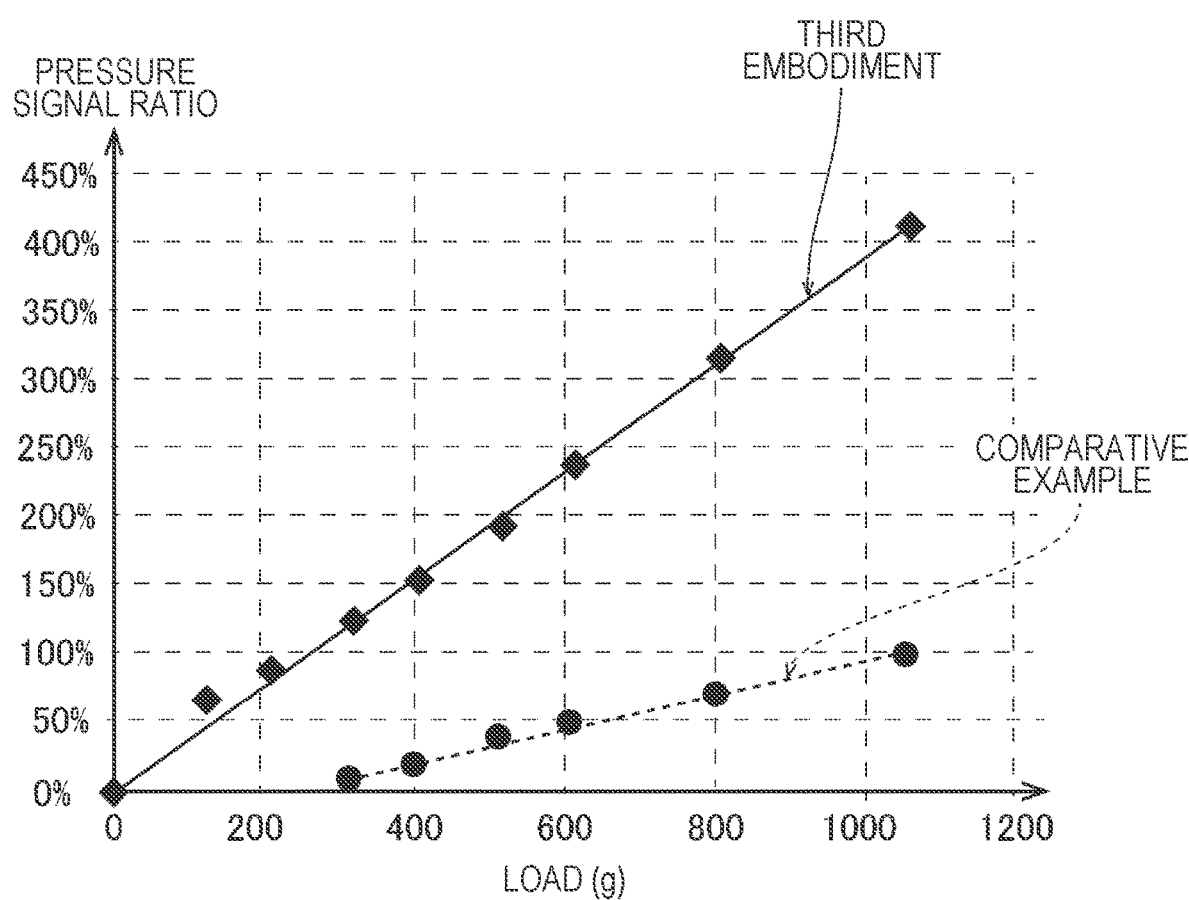
FIG. 12 is a diagram showing a result of a comparison between the magnitudes of pressure signals of a touch panel according to the third embodiment and the magnitudes of pressure s goals of a touch panel according to a comparative example.

Comparison Between Configuration According to Third Embodiment and Configuration According to Comparative Example Next, a result of a comparison between the magnitudes of pressure signals of the touch panel 301 according to the third embodiment and the magnitudes of pressure signals of a touch panel according to a comparative example is shown with reference to FIG. 12. FIG. 12 is a diagram showing the result of the comparison between the magnitude of the pressure signals of the touch panel 301 according to the third embodiment and the magnitude of the pressure signals of the touch panel according to the comparative example. This result of the comparison was obtained by measuring the magnitudes of the pressure signals in a case where the thickness of a cover member was 1.1 mm, where the thickness of an OCA layer was 110 µm, where the thicknesses of first and second substrates were each 50 µm, where the thickness of a pressure-sensitive layer was 100 µm, and where loads of 125 g to 1050 g were applied onto the cover member. It should be noted that these conditions are just a few examples used to make the comparison, and the present disclosure is not limited to these conditions.

Let it be assumed here that in the touch panel according to the comparative example, the area of a pressure detecting section and the area of a position detecting section are equal to each other and the distance between the center positions of a plurality of pressure detecting sections in the X direction and the distance between the center positions of a plurality of pressure detecting sections in the Y direction are each 4.9 mm. Let it be also assumed that the area of a pressure detecting section 361 according to the third embodiment is 419% of (4.19 times as large as) the area of a pressure detecting section according to the comparative example.

As shown in FIG. 12, it turned out that the touch panel according to the comparative example cannot detect a pressure signal in a case where a load of 300 g or less is applied. Further, assuming that a pressure signal detected by the touch panel according to the comparative example in a case where a load of 1050 g was applied is 100& (reference), pressure signals according to the third embodiment were 66% at a load of 125 g and 125% at a load of 321 g. Further, at a load of 1050 g, a pressure signal according to the third embodiment was 412%, which is 4.12 times as high as the pressure signal detected by the touch panel according to the comparative example.

Fourth Embodiment

Next, a configuration of a display device 400 according to a fourth embodiment is described with reference to FIGS. 13 and 14. In the fourth embodiment, two adjacent pressure detecting electrodes 421a are connected to each other. It should be noted that components that are identical to those of any of the first to third embodiments are given the same signs as those of any of the first to third embodiments, and a description of such components is omitted.

Figure 13:
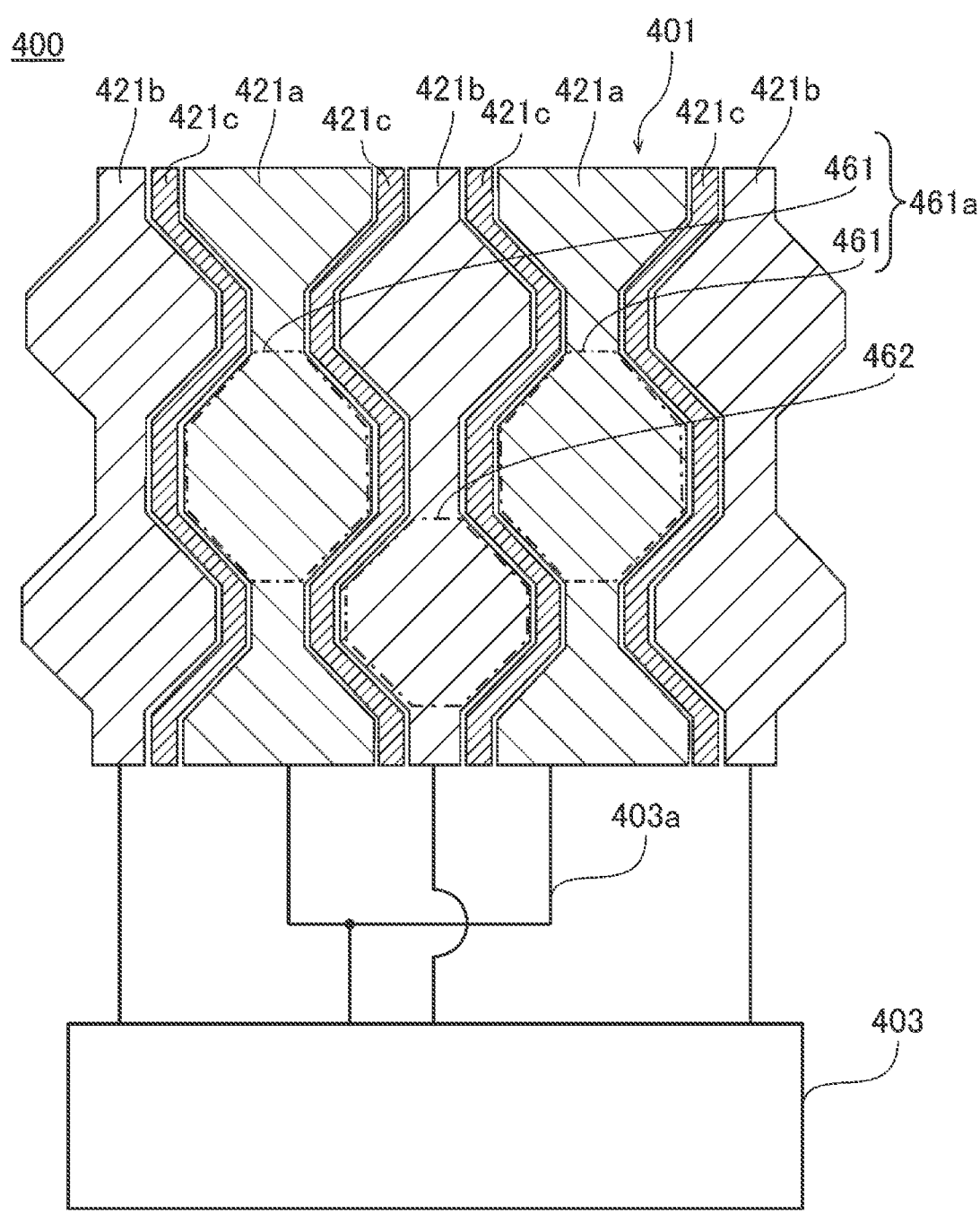
FIG. 13 is a schematic view showing a configuration of a display device according to a fourth embodiment.

FIG. 13 is a schematic view showing the configuration of the display device 400 according to the fourth embodiment. As shown in FIG. 13, the display device 400 includes a touch panel 401. The touch panel 401 includes a plurality of pressure detecting electrodes 421a and a plurality of position detecting electrodes 421b. A shield electrode 421c is disposed between a pressure detecting electrode 421a and a position detecting electrode 421b. Two adjacent ones of the plurality of pressure detecting electrodes 421a. are connected to each other by a wire 403a. This causes the two adjacent ores sure detecting electrodes 421a to be connected to an identical channel of a touch panel controller 403. As a result, a combination of a pressure signal of a pressure detecting section 461 of one of the two adjacent pressure detecting electrodes 421a and a pressure signal of a pressure detecting section 461 of the other pressure detecting electrode 421a is inputted to the touch panel controller 403. That is, in the fourth embodiment, two pressure detecting sections 461 constitute a pressure detecting section 461a corresponding to one (unit cell) of the coordinates of pressure, This causes the area of the pressure detecting section 461a to be twice as large as the area of a position detecting section 462.

Figure 14:
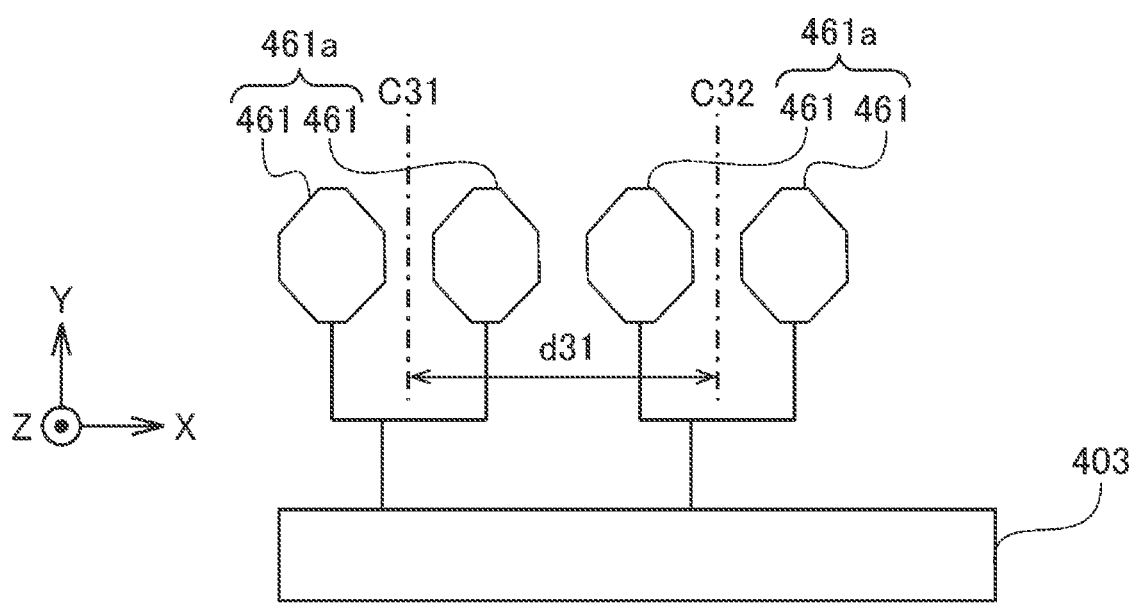
FIG. 14 is a diagram for explaining the distance between a pressure detecting section and a pressure detecting section adjacent to the pressure detecting sections

FIG. 14 is a diagram for explaining the distance d31 between a pressure detecting section 461a and a pressure detecting section 461a adjacent to the pressure detecting section 461a. As shown in FIG. 14, the distance d31 between an X-direction center line C31 of a pressure detecting section 461a and an X-direction center line C32 of a pressure detecting section 461a adjacent to the pressure detecting section 461a is longer than or equal to 5 mm and shorter than or equal to 10 mm. The other components of the fourth embodiment are similar to those of the first embodiment. It should be noted that although FIGS. 13 and 14 have illustrated an example in which the pressure detecting sections 461 and the position detecting sections 462 are each formed in the shape of a rhombus, the pressure detecting sections 461 and the position detecting sections 462 may each be formed in the shape of a rectangle as with the pressure detecting sections 61 and position detecting sections 62 of the first embodiment.

Fifth Embodiment

Next, a configuration of a display device 500 according to a fifth embodiment is described with reference to FIG. 15. In the fifth embodiment, two adjacent position detecting electrodes 421b axe connected to each other. It should be noted that components that are identical to those of any of the first to fourth embodiments are given the same signs as those of any of the first to fourth embodiments, and a description of such components is omitted.

Figure 15:
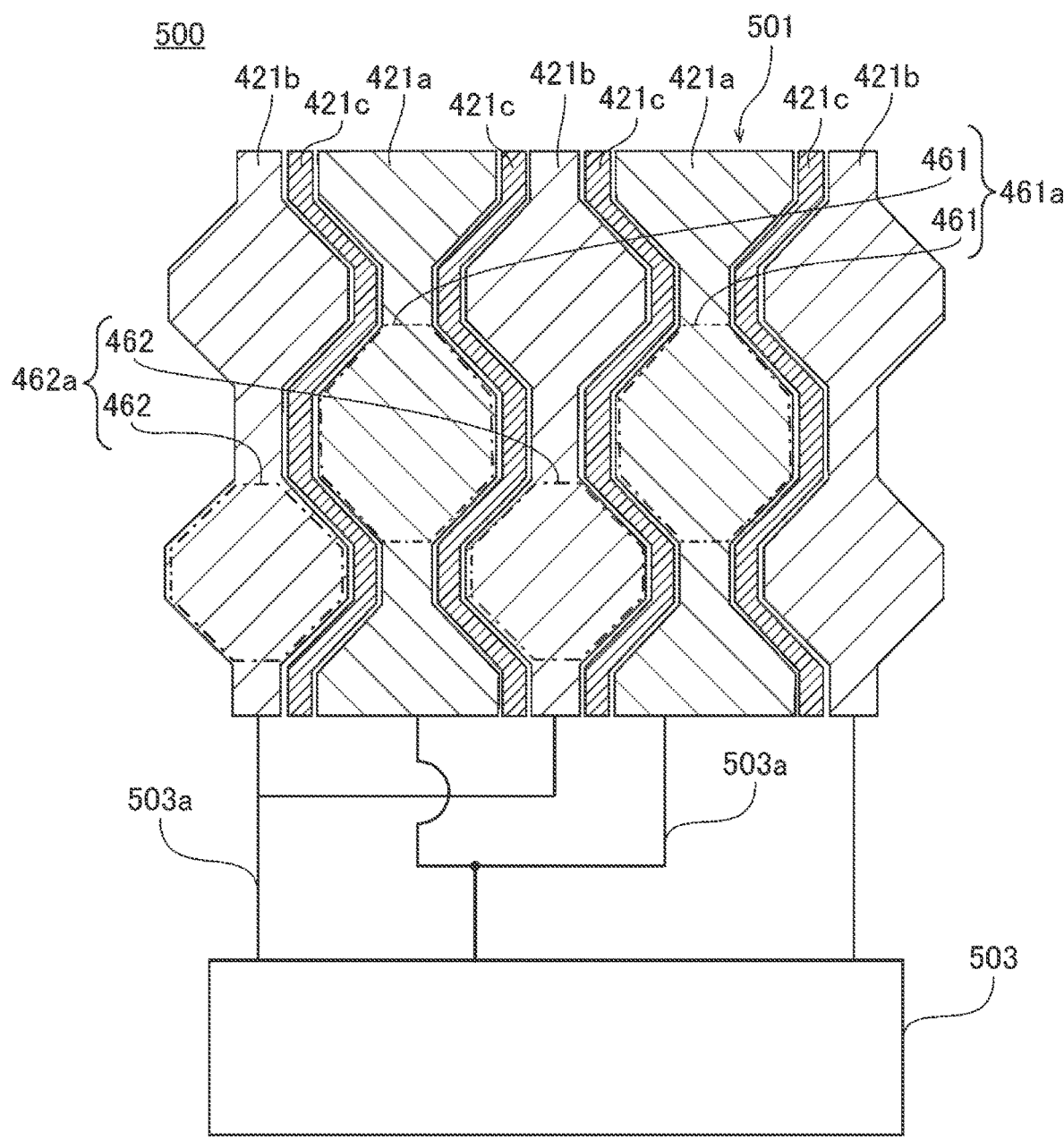
FIG. 15 is a schematic view showing a configuration of a display device according to a fifth embodiment.

FIG. 15 is a schematic view showing the configuration of the display device 500 according to the fifth embodiment. As shown in FIG. 15, the display device 500 includes a touch panel 501. The touch panel 501 includes a plurality of pressure detecting electrodes 421a and a plurality of position detecting electrodes 421b. Two adjacent ones of the plurality of pressure detecting electrodes 421a are connected to each other by a wire 503a. This causes the two adjacent pressure detecting electrodes 421a to be connected to an identical channel of a touch panel controller 503. Further, in the fifth embodiment, two adjacent ones of the plurality of position detecting electrodes 421b are connected to each other by a wire 503a. As a result, a combination of a signal from a position detecting section 462 of one of the two adjacent position detecting electrodes 421b and a signal from a position detecting section 462 of the other position detecting electrode 421b is inputted to the touch panel controller 503. That is, in the fifth embodiment, two position detecting sections 462 constitute a pressure detecting section 462a corresponding to one (unit cell) of the coordinates of pressure. This makes it possible to achieve commonality of structures between a wire 503a. connecting two pressure detecting electrodes 421a with each other and a wire 503a connecting two position detecting electrodes 421b with each other, thus making it possible to inhibit the wires from becoming complex in structure. The other components of the fifth embodiment are similar to those of the fourth embodiment. It should be noted that although FIG. 15 has illustrated an example in which the pressure detecting sections 461 and the position detecting sections 462 are each formed in the shape of a rhombus, the pressure detecting sections 461 and the position detecting sections 462 may each be formed in the shape of a rectangle as with the pressure detecting sections 61 and position detecting sections 62 of the first embodiment.

Although the foregoing has described embodiments, the aforementioned embodiments are just a few examples for carrying out the present disclosure. Therefore, the present disclosure is not limited to the aforementioned embodiments, but appropriate changes may be made to the aforementioned embodiments without departing from the scope of the present disclosure.

(1) Although the first to fifth embodiments have each illustrated an example in which a touch panel is provided with a floating electrode and a shield electrode, this is not intended to limit the present disclosure. That is, the touch panel may not be provided with at least either a floating electrode or a shield electrode.

(2) Although the first to fifth embodiments have each illustrated an example in which the thickness of a cover member is greater than the thickness of a pressure-sensitive layer, this is not intended to limit the present disclosure. For example, the thickness of the cover member may be less than or equal to the thickness of the pressure-sensitive layer.

(3) Although the first to fifth embodiments have each illustrated an example in which pressure detecting sections and position detecting sections are each formed in the shape of a rhombus, this is not intended to limit the present disclosure. For example, the pressure detecting sections and the position detecting sections may each be formed in the shape of a circle or a polygon.

(4) Although the first to fifth embodiments have each illustrated an example in which a direction (Y direction) in which a plurality drive electrodes are laid side by side and a direction (X direct ion) in which a plurality of pressure detecting electrodes are laid side by side are orthogonal to each other, this is not intended to limit the present disclosure. For example, the direction in which the plurality of drive electrodes are laid side by side and the direction in which the plurality of pressure detecting electrodes are laid side by side may intersect each other at an angle of less than 90 degrees.

(5) Although the first embodiment has illustrated an example in which the area of each of a plurality of pressure detecting sections is larger than the area of any of a plurality of position detecting sections, this is not intended to limit the present disclosure. For example, a configuration may be set up such that only the areas of some of the plurality of pressure detecting sections may be larger than the areas of the plurality of position detecting sections.

(6) Although the fourth and fifth embodiments have each illustrated an example in which two pressure detecting electrodes are connected to each other by a wire, this is not intended to limit the present disclosure. For example, in a case where a flexible printed board is disposed between a touch panel and a touch panel controller, two pressure detecting electrodes may be connected to each other within the flexible printed board, or two pressure detecting electrodes may be connected to each other within an integrated circuit including the touch panel controller.

(7) Although the first to fifth embodiment has illustrated an example in which the potential of a shield electrode is the potential of a ground, this is not intended to limit the present disclosure. For example, the potential of the shield electrode may be equal to the potential of a position detecting electrode or the potential of a pressure detecting electrode.

Figure 16:
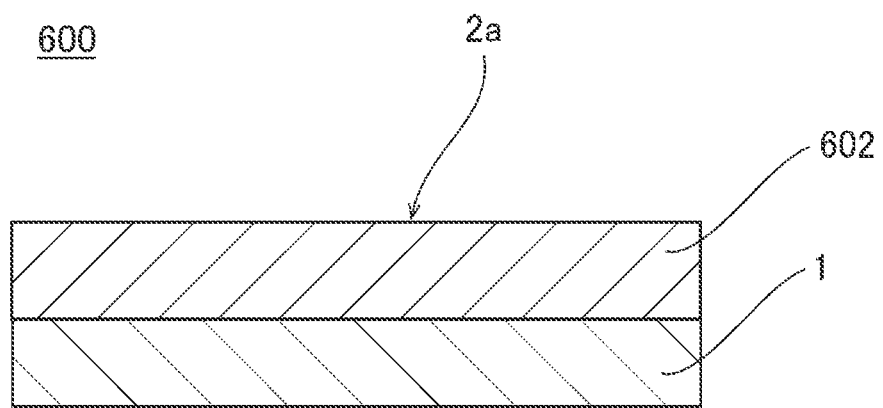
FIG. 16 is a cross-sectional view schematically showing a display device according to a modification of the first to fifth embodiments.

(8) Although the first to fifth embodiment has illustrated an example in which the touch panel is disposed on a display surface of a display section (on a display) as shown in FIG. 1, this is not intended to limit the present disclosure. For example, as in the case of a display device 600 according to a modification of the first to fifth embodiments shown in FIG. 16, the touch panel 1 may be disposed on a side of a display section 602 opposite to the display surface 2a.

(9) Although the second embodiment has illustrated an example in which the distance d11 and the distance d12 are equal to each other and the third embodiment has illustrated an example in which the distance d21 and the distance d22 are equal to each other, this is not intended to limit the present disclosure. The distance d11 and the distance d12 may be different in magnitude from each other, and the distance d21 and the distance d22 may be different from each other.

The aforementioned capacitive touch panels and the aforementioned display devices can also be described as follows.

According to a first configuration, there is provided a capacitive touch panel including a touch panel section including a plurality of drive electrodes to which a drive signal is supplied, a plurality of pressure detecting electrodes, and a plurality of position detecting electrodes and a cover member disposed at a touch surface side of the touch panel section, wherein of the plurality of pressure detecting electrodes and the plurality of position detecting electrodes, a pressure detecting electrode and a position detecting electrode are alternately arranged in a first direction, the plurality of drive electrodes are arranged side by side in a second direction that is orthogonal to the first direction in plan view, the plurality of pressure detecting electrodes each include a plurality of pressure detecting sections, arranged side by side in the second direction, that each independently detect a pressure, the plurality of position detecting electrodes each include a plurality of position detecting sections, arranged side by side in the second direction, that each independently detect a touched position, and in the touch panel section, furthermore, an area of at least one of the plurality of pressure detecting sections is larger than an area of at least one of the plurality of position detecting sections (first configuration).

The first configuration makes it possible to increase the area of at least one of the pressure detecting sections, thus making it possible to improve pressure detection sensitivity even in a case where the cover member is provided.

In the first configuration, the plurality of pressure detecting sections and the plurality of position detecting sections may each be formed in a shape of a rectangle in plan view (second configuration).

Note here that in a case where the pressure detecting sections and the position detecting sections are each formed in the shape of a rhombus, the area to be pressed varies depending on what position is pressed in the second direction. To address this problem, the second configuration makes it possible to inhibit the area to be pressed from varying depending on what position is pressed in the second direction, as the pressure detecting sections are each formed in the shape of a rectangle.

In the second configuration, a width of at least one of the plurality of pressure detecting electrodes in the first direction may be greater than a width of at least one of the plurality of position detecting electrodes in the first direction (third configuration).

Note here that in a case where the pressure detecting sections and the position detecting sections are each formed in the shape of a rhombus and in a case where the area of a pressure detecting section is made larger than the area of a position detecting section, one side of the pressure detecting section becomes longer, so that a gap between the pressure detecting section and the position detecting section increases. To address this problem, the third configuration makes it possible to increase the area of the pressure detecting section by making the width of the pressure detecting section larger, thus making it possible to inhibit the gap between the pressure detecting section and the position detecting section from increasing, unlike in a case where the pressure detecting section and the position detecting section are each formed in the shape of a rhombus.

In any one of the first to third configurations, an area of at least one of the plurality of pressure detecting sections may be not less than 2.5 times and not more than 7.3 times as large as an area of at least one of the plurality of position detecting sections (fourth configuration).

The fourth configuration makes it possible to reduce deterioration of pressure detection resolution by making the area of at least one of the plurality of pressure detecting sections not less than 2.5 times as large as the area of at least one of the plurality of position detecting sections and, while improving pressure detection sensitivity, making the area of at least one of the plurality of pressure detecting sections not more than 7.3 times as large as the area of at least one of the plurality of positon detecting sections.

In any one of the first to fourth configurations, a total area of the plurality of pressure detecting sections may be larger than a total area of the plurality of position detecting sections (fifth configuration).

The fifth configuration allows any pressure detecting section of the touch panel to have improved detection sensitivity.

In any one of the first to fifth configurations, in the touch panel section, a distance between center positions of the plurality of pressure detecting sections in the first direction and a distance between center positions of the plurality of pressure detecting sections in the second direction may each be longer than or equal to 5 mm and shorter than or equal to 10 mm (sixth configuration).

The sixth configuration makes it possible to further increase the area of a pressure detecting section, thus making it possible to further increase pressure detection sensitivity.

In any one of the first to sixth configurations, at least one of the plurality of pressure detecting electrodes may be connected to an adjacent pressure detecting electrode (seventh configuration).

The seventh configuration causes signals from two adjacent pressure detecting electrodes to be combined with each other, thus making it possible to improve pressure detection sensitivity.

In the seventh configuration, at least one of the plurality of position detecting electrodes may be connected to an adjacent position detecting electrode (eighth configuration).

According to the eighth configuration, at least one of the plurality of pressure detecting electrodes is connected to an adjacent pressure detecting electrode, and at least one of the plurality of position detecting electrodes may be connected to an adjacent position detecting electrode. This makes it possible to achieve commonalty of structures between a wire connecting the plurality of pressure detecting electrodes with each other and a wire connecting the plurality of position detecting electrodes with each other.

According to a ninth configuration, there is provided a capacitive touch panel including a touch panel section including a plurality of drive electrodes to which a drive signal is supplied, a plurality of pressure detecting electrodes, and a plurality of position detecting electrodes and a cover member disposed at a touch surface side of she touch panel section, wherein of the plurality of pressure detecting electrodes and the plurality of position detecting electrodes, a pressure detecting electrode and a position detecting electrode are alternately arranged in a first direction, the plurality of drive electrodes are arranged side by side in a second direction that is orthogonal to the first direction in plan view, the plurality of pressure detecting electrodes each include a plurality of pressure detecting sections, arranged side by side in the second direction, that each independently detect a pressure, the plurality of position detecting electrodes each include a plurality of position detecting sections, arranged side by side in the second direction, that each independently detect a touched position, and in the touch panel section, furthermore, either a distance between center positions of the plurality of pressure detecting sections in toe first direction or a distance between center positions of the plurality of pressure detecting sections in the second direction is longer than or equal to 5 mm and shorter than or equal to 10 mm and the other distance is longer than or equal to 4.9 mm and shorter than or equal to 10 mm (ninth configuration).

The ninth configuration makes it possible to increase the dimensions of each of the plurality of pressure detecting sections, thus making it possible to improve pressure detection sensitivity even in a case where the cover member is provided.

According to a tenth configuration, there may be provided a display device including the capacitive touch panel according to any one of the first to ninth configurations and a display that displays an image (tenth configuration).

The tenth configuration makes it possible to provide a display device that makes it possible to improve pressure detection sensitivity even in a case where a cover member is provided.

The present disclosure contains subject matter related to that disclosed in Japanese Priority Patent Application JP 2021-157563 filed in the Japan Patent Office on Sep. 28, 2021, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A capacitive touch panel comprising:
a touch panel section comprising a plurality of drive electrodes to which a drive signal is supplied, a plurality of pressure detecting electrodes, and a plurality of position detecting electrodes; and
a cover member disposed at a touch surface side of the touch panel section,
wherein of the plurality of pressure detecting electrodes and the plurality of position detecting electrodes, a pressure detecting electrode and a position detecting electrode are alternately arranged in a first direction,
the plurality of drive electrodes is arranged side by side in a second direction that is orthogonal to the first direction in plan view,
each of the plurality of pressure detecting electrodes comprises a plurality of pressure detecting sections that is arranged side by side in the second direction, and that each independently detects a pressure,
each of the plurality of position detecting electrodes comprises a plurality of position detecting sections that is arranged side by side in the second direction, and that each independently detects a touched position,
in the touch panel section, an area of at least one of the plurality of pressure detecting sections is larger than an area of at least one of the plurality of position detecting sections, and the area of the at least one of the plurality of pressure detecting sections is not less than 2.5 times and not more than 7.3 times as large as the area of the at least one of the plurality of position detecting sections.

2. The capacitive touch panel according to claim 1, wherein the plurality of pressure detecting sections and the plurality of position detecting sections are each formed in a shape of a rectangle in plan view.

3. The capacitive touch panel according to claim 2, wherein a width of at least one of the plurality of pressure detecting electrodes in the first direction is greater than a width of at least one of the plurality of position detecting electrodes in the first direction.

4. The capacitive touch panel according to claim 1, wherein a total area of the plurality of pressure detecting sections is larger than a total area of the plurality of position detecting sections.

5. The capacitive touch panel according to claim 1, wherein in the touch panel section, a distance between center positions of the plurality of pressure detecting sections in the first direction and a distance between center positions of the plurality of pressure detecting sections in the second direction are each longer than or equal to 5 mm and shorter than or equal to 10 mm.

6. The capacitive touch panel according to claim 1, wherein at least one of the plurality of pressure detecting electrodes is connected to an adjacent pressure detecting electrode.

7. The capacitive touch panel according to claim 6, wherein at least one of the plurality of position detecting electrodes is connected to an adjacent position detecting electrode.

8. A capacitive touch panel according to claim 1, wherein in the touch panel section, one of a first distance between center positions of the plurality of pressure detecting sections in the first direction and a second distance between center positions of the plurality of pressure detecting sections in the second direction is longer than or equal to 5 mm and shorter than or equal to 10 mm and another one of the first distance and the second distance is longer than or equal to 4.9 mm and shorter than or equal to 10 mm.

9. A display device comprising:
the capacitive touch panel according to claim 1; and a display that displays an image.

\* \* \* \* \*